US012701432B2

(12) United States Patent
Nakamura

(10) Patent No.: US 12,701,432 B2
(45) Date of Patent: Aug. 4, 2026

(54) INFORMATION PROCESSING DEVICE AND INFORMATION PROCESSING METHOD

(71) Applicants:Nissan Motor Co., Ltd., Yokohama (JP); RENAULT S.A.S., Boulogne-Billancourt (FR)

(72) Inventor: Mitsunori Nakamura, Kanagawa (JP)

(73) Assignees: Nissan Motor Co., Ltd., Yokohama (JP); RENAULT S.A.S., Boulogne-Billancourt (FR)

( * ) Notice: Subject to any disclaimer, the term of this patent is extended or adjusted under 35 U.S.C. 154(b) by 362 days.

(21) Appl. No.: 18/547,887

(22) PCT Filed: Mar. 10, 2021

(86) PCT No.: PCT/IB2021/000165
§ 371 (c)(1),
(2) Date: Aug. 25, 2023

(87) PCT Pub. No.: WO2022/189821
PCT Pub. Date: Sep. 15, 2022

(65) Prior Publication Data
US 2024/0147255 A1 May 2, 2024

(51) Int. Cl.
*H04W 16/00* (2009.01)
*H04W 4/46* (2018.01)
(Continued)

(52) U.S. Cl.
CPC ............. *H04W 16/28* (2013.01); *H04W 4/46* (2018.02); *H04W 64/00* (2013.01)

(58) Field of Classification Search
CPC ....... H04W 16/28; H04W 4/46; H04W 64/00; H04W 4/023; H04W 4/027; H04W 76/14;
(Continued)

(56) References Cited

U.S. PATENT DOCUMENTS

| 10,527,706 B1* | 1/2020 | Zhang .................... H04W 64/00 |
| 2010/0088181 A1* | 4/2010 | Crolley ................. H04W 4/029 |
| | | 455/66.1 |

(Continued)

FOREIGN PATENT DOCUMENTS

| JP | 2018-67880 A | 4/2018 |
| KR | 10-2014-0046127 A | 4/2014 |

(Continued)

OTHER PUBLICATIONS

Extended European Search Report of Mar. 12, 2024 of corresponding European Patent Application No. 21929996.3.
(Continued)

*Primary Examiner* — Md K Talukder
(74) *Attorney, Agent, or Firm* — Spencer Fane LLP

(57) ABSTRACT

An information processing device includes a communication unit and a controller. The communication unit performs data communication with another vehicle present in a periphery of a host vehicle. The controller controls the data communication performed by the communication unit. The communication unit has a normal mode, and a directivity mode in which directivity of wireless communication is controlled to a greater extent than in the normal mode so that data communication can be performed with another vehicle at a position at which data communication cannot be performed in the normal mode. The controller receives server data from a server that includes information pertaining to the other vehicle present at the position at which data communication cannot be performed in the normal mode. The controller controls the directivity of the wireless communication of the communication unit based on the information pertaining to the other vehicle from the server.

11 Claims, 6 Drawing Sheets

(51) Int. Cl.
*H04W 16/28* (2009.01)
*H04W 64/00* (2009.01)

(58) Field of Classification Search
CPC ..... H04W 92/18; H04B 7/04; H04B 7/06952;
H04B 7/088
See application file for complete search history.

(56) References Cited

U.S. PATENT DOCUMENTS

| | | | |
|---|---|---|---|
| 2013/0045683 A1* | 2/2013 | Wang | H04B 5/79 |
| | | | 455/41.2 |
| 2019/0238658 A1* | 8/2019 | Shimizu | H04W 4/46 |
| 2019/0356569 A1* | 11/2019 | Kawauchi | G08G 1/096775 |
| 2020/0077279 A1* | 3/2020 | Foerster | H04B 7/0408 |
| 2020/0098254 A1* | 3/2020 | Oyabu | H04B 7/06 |
| 2021/0014643 A1* | 1/2021 | Kuroda | H04W 4/026 |
| 2021/0152993 A1* | 5/2021 | Fujimoto | H04W 16/28 |
| 2021/0266715 A1* | 8/2021 | Uchiyama | H04W 4/48 |
| 2022/0176975 A1* | 6/2022 | Nakamura | H04W 4/029 |
| 2024/0147255 A1* | 5/2024 | Nakamura | H04W 4/46 |

FOREIGN PATENT DOCUMENTS

| | | | |
|---|---|---|---|
| WO | 2020/008911 A1 | 1/2020 |
| WO | 2020/022399 A1 | 1/2020 |

OTHER PUBLICATIONS

1 Office Action of Feb. 24, 2025 of corresponding Korean Patent Application No. 10-2023-7031953.

* cited by examiner

INFORMATION PROCESSING DEVICE AND INFORMATION PROCESSING METHOD

CROSS-REFERENCE TO RELATED APPLICATIONS

This application is a U.S. national stage application of International Application No. PCT/IB2021/000165, filed on Mar. 10, 2021.

BACKGROUND

Technical Field

The present invention relates to an information processing device and an information processing method.

Background Information

Japanese Laid-Open Patent Application No. 2018-67880 (Patent Document 1) discloses a communication device comprising a communication unit that performs vehicle-to-vehicle communication with a plurality of other vehicles present around a host vehicle via an antenna unit. The communication device furthermore comprises an acquisition unit for acquiring information relating to the plurality of other vehicles, and a control unit for controlling at least one of gain and directivity direction of the antenna unit based on the information acquired by the acquisition unit.

SUMMARY

A technique disclosed in Patent Document 1 involves controlling a directivity of an antenna unit with respect to other vehicles detected by a radar device. Even in a case involving other vehicles that could affect future travel of a host vehicle, the directivity of the antenna unit is not controlled with respect to the other vehicles until the radar device actually detects the other vehicles. Therefore, there is a concern that it will be impossible to suitably accept necessary information.

The present invention was contrived in view of the foregoing problem, it being an object of the present invention to provide an information processing device and an information processing method with which it is possible to suitably accept necessary information.

An information processing device according to one aspect of the present invention comprises a communication unit for performing data communication with a second moving body present around a first moving body and with a server, and a controller for controlling the data communication performed by the communication unit. The communication unit is provided with a normal mode, and a directivity mode in which it is possible to perform data communication with a second moving body present at a position at which it is impossible to perform data communication in the normal mode. The controller: receives, from the server, server data including information pertaining to the second moving body present at the position at which it is impossible to perform data communication in the normal mode; and controls the directivity of the wireless communication performed by the communication unit based on the information pertaining to the second moving body that is included in the server data.

The present invention makes it possible to suitably accept necessary information.

BRIEF DESCRIPTION OF THE DRAWINGS

Referring now to the attached drawings which form a part of this original disclosure.

DETAILED DESCRIPTION OF EMBODIMENTS

Figure 1:
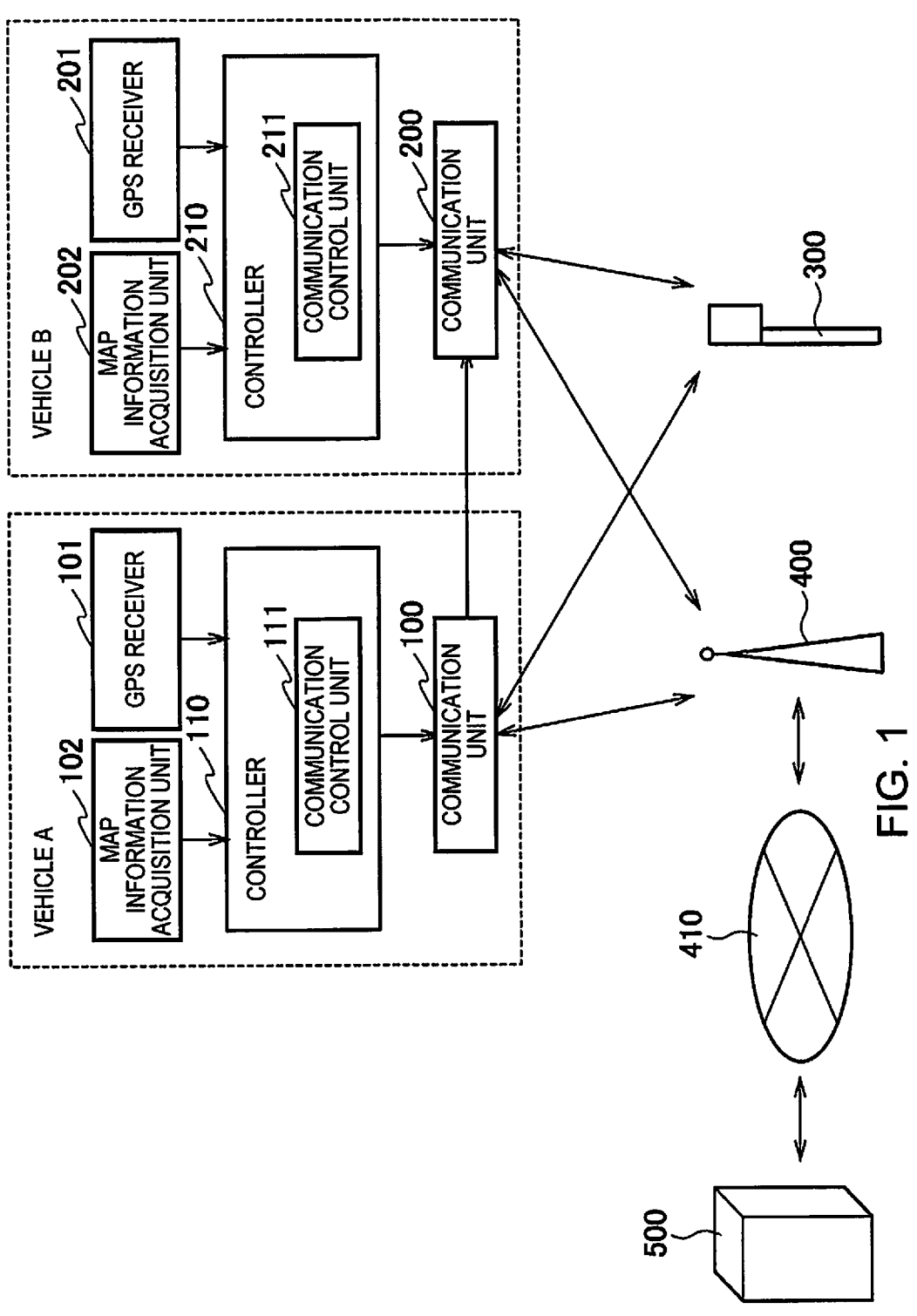
FIG. 1 is a block diagram showing a communication network according to the present embodiment.

A preferred embodiment of the present invention is described below with reference to the accompanying drawings. Identical configurations appearing in the drawings are assigned identical reference symbols and are not redundantly described.

A communication network according to the present embodiment shall be described with reference to FIG. 1. The communication network according to the present embodiment is provided with a vehicle A and a vehicle B. The vehicle A and the vehicle B are examples of moving bodies (first moving body and second moving body). The vehicle A is a host vehicle, and the vehicle B is another vehicle present around the host vehicle. In FIG. 1, only a single vehicle B is depicted, but there can be a plurality of vehicles B.

The vehicle A and the vehicle B can have autonomous driving functions, but also can lack autonomous driving functions. Additionally, the vehicle A and the vehicle B can be capable of switching between autonomous driving and manual driving. In the present embodiment, the vehicle A and the vehicle B are described as vehicles having autonomous driving functions.

The communication network is furthermore provided with a roadside unit 300, a base station 400, and a server 500.

The vehicle A is provided with a communication unit 100 having a data communication function. The vehicle B is provided with a communication unit 200 having a data communication function. Each of the communication units 100, 200 is configured from, e.g., one or more antennas, a modem, an application processor, a memory, and the like.

The communication unit 100 and the communication unit 200 are capable of communicating directly with one another. Direct communication performed by the communication unit 100 and the communication unit 200 is defined below as direct communication. Direct communication can also be expressed as vehicle-to-vehicle communication. In the present embodiment, the vehicle A and the vehicle B are capable of sharing a plurality of items of data, such as information pertaining to the vehicles (vehicle A and vehicle B), through direct communication.

The communication unit 100 and the communication unit 200 are also capable of communicating with one another via a base station 400 and a network 410 (e.g., a cellular telephone network). The base station 400 is a fixed communication device that does not move, the base station 400 serving as an access point that covers the network 410. Communication performed between the communication unit 100 and the communication unit 200 via the base station 400 and the network 410 is defined as indirect communication, in contrast to direct communication.

Direct communication, due to not being performed via the base station 400 and the network, makes it possible to transmit data to a counterpart using a simple configuration having low delay. Indirect communication is used when transmitting high-volume data that cannot be sent by direction communication or data that is to be repeatedly sent without there being any change in given-time information. Indirect communication can also be used in cases in which direct communication is impossible.

Each of the communication units 100, 200 can communicate with the roadside unit 300. The roadside unit 300 is a fixed communication device that can be installed, for example, on a road facility at a road shoulder, the roadside unit 300 distributing distribution data including prescribed information to vehicles on a road. The roadside unit 300 (RSU) can also be referred to as an intelligent transport systems (ITS) spot.

The roadside unit 300 indicated in the present embodiment corresponds to a transmitting station, and the communication units 100, 200 correspond to receiving stations. The roadside unit 300 and the communication units 100, 200 perform downlink communication from the roadside unit 300 to the communication units 100, 200. However, the roadside unit 300 and the communication units 100, 200 are capable of performing uplink communication in a reverse direction. In such a case, the communication units 100, 200 correspond to transmitting stations, and the roadside station 300 corresponds to a receiving station. Communication between the communication units 100, 200 and the roadside unit 300 is also referred to as road-to-vehicle communication.

The distribution data that is distributed from the roadside unit 300 includes roadside-unit data indicating information pertaining to the roadside unit 300, and traffic data indicating information pertaining to vehicles present around the roadside unit 300. The information pertaining to the roadside unit 300 includes, inter alia, position information pertaining to the roadside unit 300. The information pertaining to vehicles includes, inter alia, position information, speed information, and advancement-direction information pertaining to the vehicles.

The communication unit 100 and the communication unit 200 communicate with the server 500 via the base station 400 and the network 410. The server 500 is a device for managing information pertaining to vehicles traveling on the road. The information pertaining to vehicles that is managed by the server 500 includes not only basic information pertaining to the vehicles such as identification information, position information, speed information, and advancement-direction information, but also detailed information pertaining to the vehicles such as a type, a past trajectory, and a future trajectory that is based on a past travel trajectory. The server 500 distributes server data including the information pertaining to vehicles to the vehicles on the road in response to a request from the vehicles or within a prescribed period. A method by which the server 500 distributes the server data can be a method involving distribution via the base station 400 and the network 410 or can be a method involving distribution via the roadside unit 300.

A configuration of the vehicle A shall be described next.

The vehicle A is provided with the communication unit 100 described above, a GPS receiver 101, a map information acquisition unit 102, and a controller 110. The communication unit 100, GPS receiver 101, map information acquisition unit 102, and controller 110 constitute an information processing device for realizing the vehicle-to-vehicle communication indicated in the present embodiment.

The GPS receiver 101 receives radio waves from an artificial satellite, thereby detecting position information pertaining to the vehicle A on a surface of Earth. The position information pertaining to the vehicle A detected by the GPS receiver 101 includes latitude information, longitude information, and time information. The GPS receiver 101 outputs the detected position information pertaining to the vehicle A to the controller 110. A method by which the position information pertaining to the vehicle A is detected is not limited to involving the GPS receiver 101. For example, the position can be estimated using a method known as odometry. Odometry is a method for deriving an amount of movement of the vehicle A and a movement direction thereof in accordance with a turning angle and a turning-angle speed of the vehicle A, whereby the position of the vehicle A is estimated. A global positioning system (GPS) is part of a global navigation satellite system (GNSS).

The map information acquisition unit 102 acquires map information indicating a structure of the road on which the vehicle A is traveling. The map information acquisition unit 102 can possess a map database in which the map information is stored or can acquire the map information from an external map data server through cloud computing. The map information acquisition unit 102 can also acquire the map information using vehicle-to-vehicle communication or road-to-vehicle communication.

The map information includes: node information, including a type of node, a position of the node, or other information indicating an intersection, junction, or the like; and link information, including a type, link length, lane count, curvature, slope, or other features of a link that is a road segment linking nodes. The link information also includes information pertaining to road structure, such as absolute positions of lanes and relationships pertaining to connection of the lanes. The map information furthermore includes information pertaining to traffic regulations, road signs, and the like.

The controller 110 is configured from, e.g., a microcomputer. The controller 110 has, e.g., a central processing unit (CPU) or other hardware processor, a memory, and a variety of interfaces. The memory and the variety of interfaces are connected to the hardware processor via a bus.

A computer program for causing the microcomputer to function as an information processing device is installed in the microcomputer. Due to execution of the computer program, the microcomputer functions as a plurality of information processing circuits provided to the information processing device. The controller 110 is provided with a communication control unit 111, as one example of the plurality of information processing circuits.

The communication control unit 111 controls wireless communication (data communication) performed by the communication unit 100.

The communication control unit 111 performs such actions as switching an operating mode of the communication unit 100 and controlling a beam formed by the communication unit 100. The communication unit 100 has, as operating modes that can be switched between, a normal mode and a directivity mode. The operating modes of the communication unit 100 shall be described with reference to FIGS. 2A and 2B.

Figure 2A:
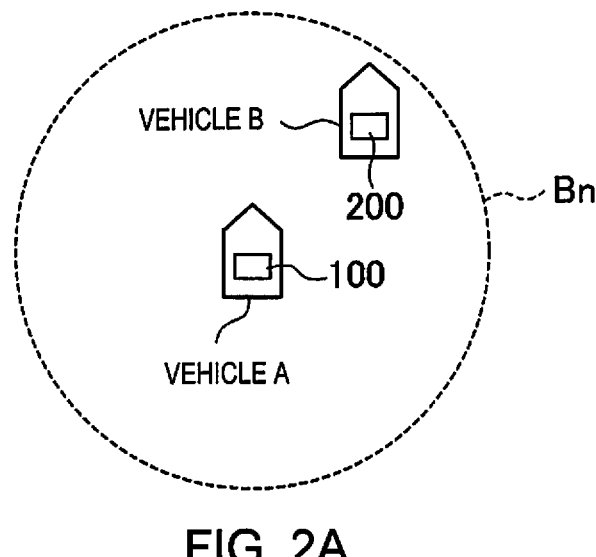
FIG. 2A is a diagram illustrating a normal mode of a communication unit.

The normal mode shall be described with reference to FIG. 2A. In the normal mode, wireless communication is performed for a preset range (area) without the directivity of the wireless communication of the communication unit 100 being controlled. When operating in the normal mode, the communication unit 100, or more specifically the antenna of the communication unit 100, forms a normal beam Bn for a prescribed range (area). The normal beam Bn is, for example, formed uniformly at every bearing, and does not have directivity with respect to a specific bearing. The normal beam Bn is formed in a circular range that is centered on the communication unit 100 and has a prescribed distance as a radius. Thus, the prescribed range in which the normal beam Bn is formed can be a circular range that has the prescribed distance as a radius or, as another example, can be a prescribed range having directivity in a prescribed direction, such as a vehicle advancement direction. Thus, in the normal mode, the normal beam Bn is formed for the preset prescribed range by the antenna of the communication unit 100.

The vehicle A can communicate with a vehicle B present within the area in which the normal beam Bn is formed. The area in which it is possible to communicate with a communication unit 100 operating in the normal mode is referred to as a normal communication area. The normal communication area basically corresponds to the area in which the normal beam Bn is formed. However, even in the area in which the normal beam Bn is formed, it might be impossible to communicate with the vehicle B at a communication quality equal to or higher than a given level due to effects of dampening of radio waves or effects of a communication environment in which an obstruction is present. Specifically, the normal communication area refers to an area in which it is possible to communicate with the vehicle B at a communication quality equal to or higher than a given level and does not necessarily coincide with the area (prescribed range) in which the normal beam Bn is formed.

Figure 2B:
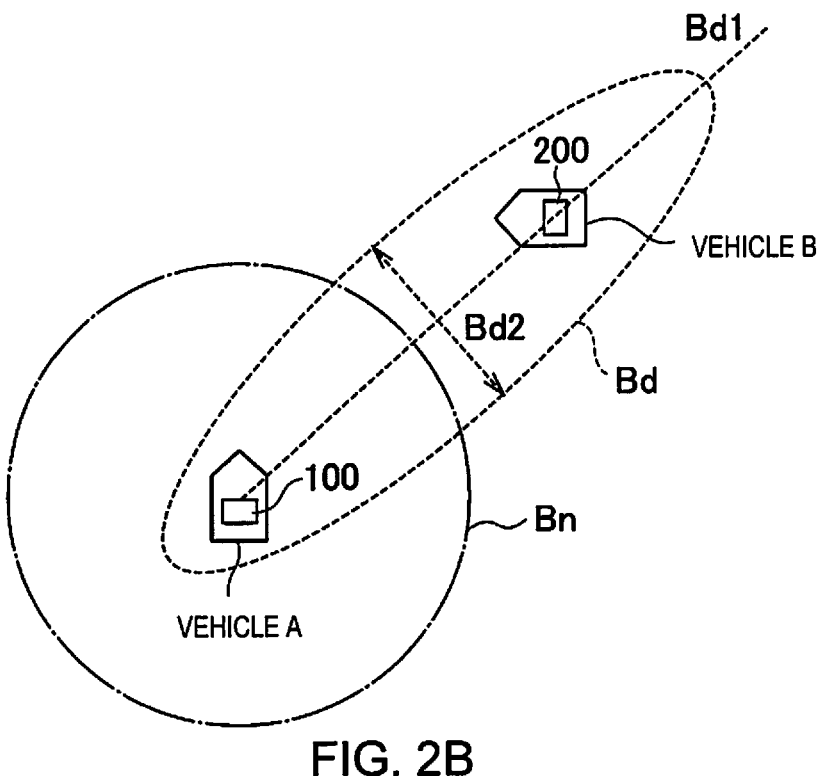
FIG. 2B is a diagram illustrating a directivity mode of the communication unit.

The directivity mode shall be described with reference to FIG. 2B. In the directivity mode, the directivity of the wireless communication of the communication unit 100 can be controlled to a greater extent than in the normal mode. In the present description, the directivity of the wireless communication is referred to below simply as "directivity." When operating in the directivity mode, the antenna of the communication unit 100 forms a directional beam Bd. The directional beam Bd is formed toward a specific bearing and has directivity with respect to the specific bearing. The bearing corresponds to a horizontal component of a direction. The directional beam Bd is formed as a beam having a prescribed beam width Bd2 centered on a beam axis Bd1 having a prescribed azimuth. The azimuth of the beam axis Bd1 and the beam width Bd2 can be individually adjusted, thereby making it possible to adjust the directivity of the communication unit 100. Thus, the directional mode corresponds to an operating mode in which the antenna of the communication unit 100 has directivity.

The vehicle A can communicate with the vehicle B present in the area in which the directional beam Bd is formed. The directional beam Bd is formed to be long in a direction following the beam axis Bd1, a distance in said direction (axial-direction distance) being greater than a radial distance of the normal beam Bn. Additionally, a reception strength in communication using the directional beam Bd is relatively higher than a reception strength in communication using the normal beam Bn when it is assumed that the vehicle B is present at a same position for each type of beam. Thus, using the directional beam Bd makes it possible to communicate with the vehicle B at a location outside of the normal communication area. The directional beam Bd makes it possible to perform data communication with the vehicle B present at a position at which it is impossible to perform data communication using the normal beam Bn. Specifically, in the directivity mode, directivity is controlled to a greater extent than in the normal mode, thereby making it possible to perform data communication with the vehicle B present at the position at which it is impossible to perform data communication in the normal mode.

When the communication unit 100 operates in the directivity mode, the communication control unit 111 controls the directional beam Bd. The control over the directional beam Bd includes beamforming for adjusting the azimuth of the beam axis Bd1 and the beam width Bd2. The communication control unit 111 controls the directivity of the communication unit 100, i.e., the directivity of the beam formed by the antenna of the communication unit 100, through beamforming.

The communication unit 100 broadcasts vehicle-A-position data including, inter alia, current position information and travel-plan information pertaining to the vehicle A. A direct communication scheme is used in the broadcast transmission. The direct communication scheme is, for example, DSRC (frequency: 5.9 GHz band), which is compliant with IEEE 802.11p, or Cellular V2X, which is compliant with specifications in 3GPP Release 14 or later.

The current position information is data correlating a latitude and longitude indicating a current position of the vehicle A and a time at which the position is acquired.

The travel-plan information is travel-plan data including vehicle-speed-plan data correlating a vehicle speed with a future position at which the vehicle A will travel in the future, and future-travel-route data. The future-travel-route data (future-route data) includes information pertaining to a route on which the vehicle A will travel in the future. The future-travel-route data can be route information pertaining to a travel route for traveling to a preset destination or can be data in which an expected passage time is correlated with a future position (latitude and longitude) based on the vehicle-speed-plan data. For example, the travel-plan information is data obtained by adding the vehicle-speed-plan data to data that conforms to a message under SAE J2735 (dedicated short range communications (DSRC) message set dictionary). The term "future" indicates a given point in time that will be reached after a prescribed time from a current time.

An example of the vehicle-A-position data that is broadcasted is shown in table 1. The vehicle-A-position data is package data including a header and content data.

TABLE 1

| Header | Identification number for transmission-source vehicle Identification information indicating type of content included in content area (containing, e.g., current position, travel-plan information, and identification ID of future position) |
|---|---|
| Content data | Current position information: data correlating time when position information is acquired with latitude and longitude Travel-plan information: travel-plan data including vehicle-speed-plan data correlating vehicle speed with future position of vehicle, and future-travel-route data |

As shown in table 1, an identification number for the vehicle A serving as a transmission source and identification information indicating a type of content included in the content data (e.g., an ID for identification indicating the current position information, the travel-plan information, and the like) are stored in the header of the vehicle-A-position data. The content data contains the current position information, which is data correlating the time when the position information is acquired with the latitude and longitude, and the travel-plan information.

As well as a function for controlling wireless communication performed by the communication unit 100, the communication control unit 111 assumes a data processing function for performing a variety of processes that are necessary for implementing wireless communication. The vehicle-A-position data, which is the package data including the header and the content data, is generated by the communication control unit 111 based on data acquired from the GPS receiver 101 or the like and data that is prerecorded in a memory provided to the controller 110. The vehicle-A-position data is transmitted by the communication unit 100 and received by the communication unit 200 of the vehicle B.

The communication unit 100 receives vehicle-B-position data that is transmitted by the communication unit 200 of the vehicle B and outputs the received vehicle-B-position data to the communication control unit 111. The communication control unit 111 acquires the vehicle-B-position data from the communication unit 100. Receipt of the vehicle-B-position data by the communication unit 100 means that direct communication between the vehicle A and the vehicle B is established.

In relation to the present embodiment, the communication control unit 111 receives server data including information pertaining to another vehicle present at a position at which data communication cannot be performed in the normal mode. The communication control unit 111 controls the directivity of the communication unit 100 based on the information pertaining to the other vehicle that is included in the server data.

A configuration of the vehicle B shall be described next. As shown in FIG. 1, the vehicle B is provided with the communication unit 200 described above, a GPS receiver 201, a map information acquisition unit 202, and a controller 210. The communication unit 200, the GPS receiver 201, the map information acquisition unit 202, and the controller 210 constitute an information processing device for realizing the vehicle-to-vehicle communication indicated in the present embodiment.

Functions of the GPS receiver 201 and the map information acquisition unit 202 are similar to functions of the GPS receiver 101 and the map information acquisition unit 102. The controller 210 is configured from a microcomputer provided with a hardware processor, a memory, and a variety of interfaces, similarly to the controller 110. The controller 210 is provided with a communication control unit 211 as one example of a plurality of information processing circuits. Functions of the communication control unit 211 are the same as functions of the communication control unit 111 and include a function for controlling wireless communication performed by the communication unit 200 and a data processing function for performing a variety of processes that are necessary for implementing wireless communication, such as generating the vehicle-B-position data.

Figure 3:
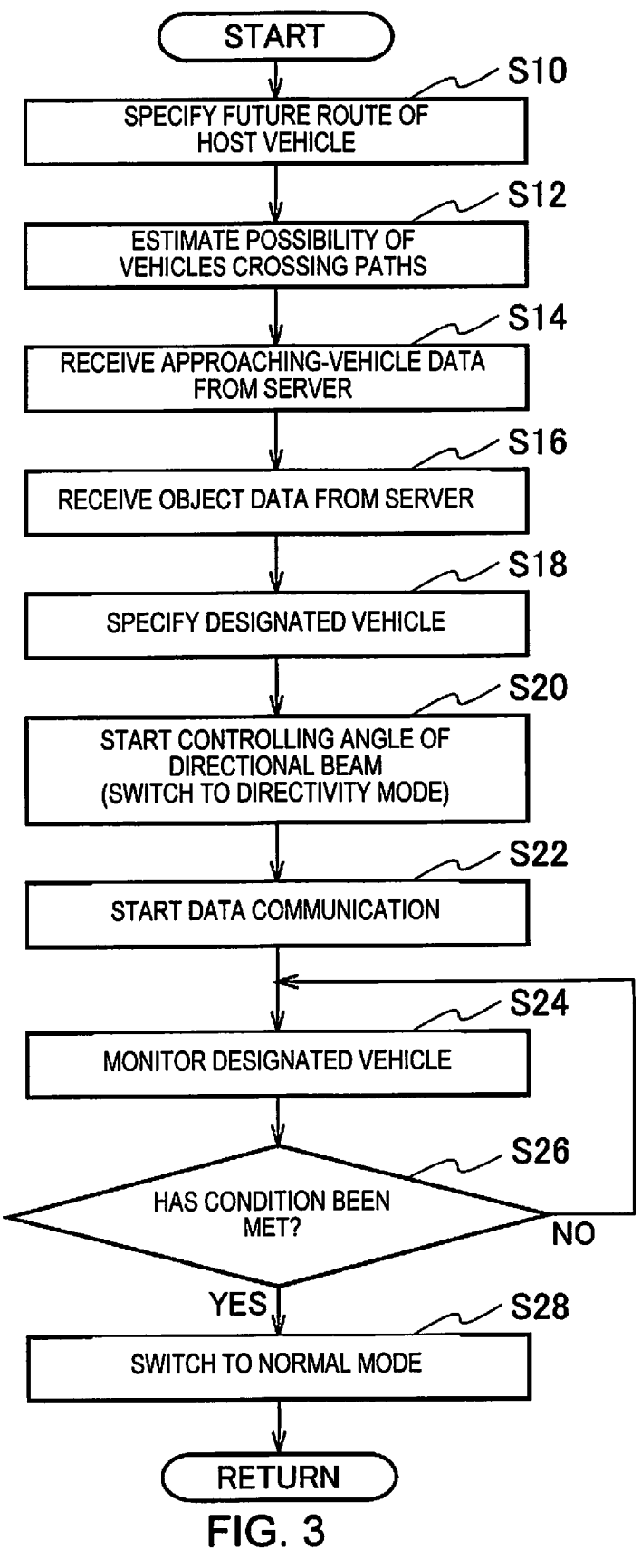
FIG. 3 is a flow chart showing a flow of a process in vehicle-to-vehicle communication on the communication network.
Figure 4:
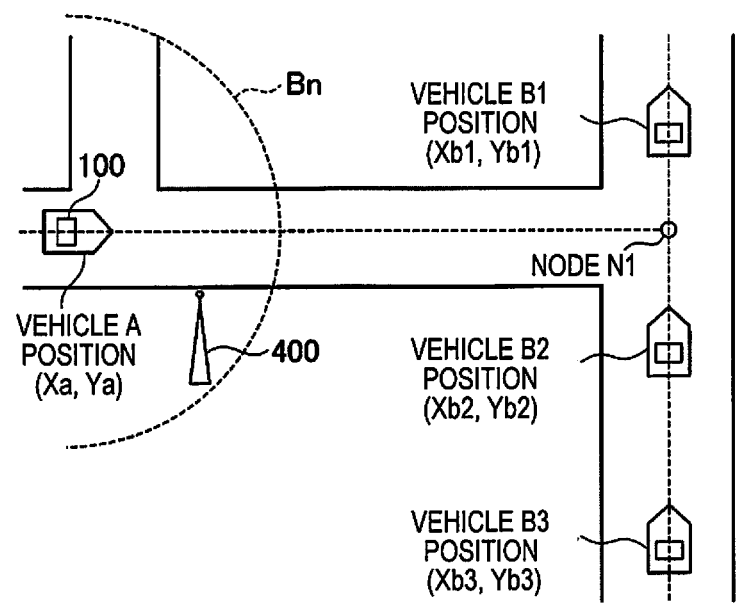
FIG. 4 is a diagram illustrating a travel scenario according to the present embodiment.

A flow of a process for vehicle-to-vehicle communication on the communication network shall be described with reference to FIGS. 3 to 6. The process shown in the flow chart in FIG. 3 is executed by the controller 110 of a host vehicle A (corresponding to the vehicle A in FIG. 1). The operating mode of the communication unit 100 is initially set to the normal mode. In the description given below, there is assumed to be a scenario involving traveling through an intersection such as that shown in FIG. 4. The host vehicle A is traveling on a road connecting to an intersection indicated by a node N1. A current position of the host vehicle A is a position (Xa, Ya) leading up to the intersection by a first distance. A route on which the host vehicle A will travel in the future is set as a route turning left at the intersection. Additionally, three other vehicles B1, B2, B3 (each of which corresponds to the other vehicle B in FIG. 1) are traveling on an intersecting road passing through the intersection indicated by the node N1. A current position of the other vehicle B1 is a position (Xb1, Yb1) beyond the intersection. A current position of the other vehicle B2 is a position (Xb2, Yb2) leading up to the intersection by a second distance, and a current position of the other vehicle B3 is a position (Xb3, Yb3) leading up to the intersection by a third distance. The second distance is shorter than a third distance, and the third distance is substantially the same as the first distance. Routes on which each of the other vehicles B1, B2, B3 will travel in the future are set as routes that advance straight ahead on the intersecting road.

First, the controller 110 specifies a future travel route on which the host vehicle A will travel in the future (S10). For example, the controller 110 acquires the future-travel-route data included in the vehicle-A-position data and specifies the future travel route from the future-travel-route data.

The controller 110 estimates a possibility of vehicles crossing paths, i.e., the possibility that the host vehicle A and another vehicle will cross paths (S12). When the host vehicle A passes through an intersection, there is a possibility that the host vehicle A will cross paths of the other vehicles B1, B2, B3 traveling on the intersecting road. The controller 110 evaluates whether or not an intersection is present on the future travel route of the host vehicle A based on the map information acquired by the map information acquisition unit 102 and the future travel route. If an intersection is present, the controller 110 evaluates that there is a possibility of vehicles crossing paths. If there is a possibility of vehicles crossing paths, the controller 110 performs the following process.

The controller 110 specifies, based on the future travel route of the host vehicle A, a condition for another vehicle approaching the host vehicle A in a scenario in which it is predicted that there is a possibility of vehicles crossing paths. If the host vehicle A will turn left at the intersection, then the other vehicle approaching the host vehicle A is another vehicle traveling on the intersecting road toward the intersection. Accordingly, the controller 110 adds a condition that another vehicle is present on the intersecting road and has a speed in a direction nearing the intersection, and then transmits first request data for requesting information pertaining to the approaching vehicle to the server 500.

Upon receiving the first request data, the server 500 specifies a vehicle corresponding to the condition. In the situation shown in FIG. 4, the server 500 specifies the other vehicles B2, B3. The server 500 generates approaching-vehicle data including information relating to the specified vehicles (other vehicles B2, B3) and transmits the approaching-vehicle data to the communication unit 100. When the communication unit 100 receives the approaching-vehicle data (S14), the controller 110 acquires the approaching-vehicle data. The approaching-vehicle data includes only basic information pertaining to the vehicles such as identification information, position information, speed information, and advancement-direction information. As described above, adding the condition and transmitting the first request data makes it possible to acquire approaching-vehicle data pertaining to particular other vehicles B2, B3, rather than to all of the other vehicles present around the host vehicle A.

The controller 110 imparts a priority order to the other vehicles B2, B3 included in the approaching-vehicle data based on the approaching-vehicle data. Specifically, the controller 110 determines a priority order for the other vehicles B2, B3 that could cross a path of the host vehicle A based on current positions and speeds of the other vehicles B2, B3 and a current position and speed of the host vehicle A. The priority order is higher for the other vehicle B2, B3 having a higher possibility of crossing the path of the host vehicle A.

For example, the controller 110 predicts a time at which the other vehicles B2, B3 will arrive at the intersection based on the current positions and speeds of the other vehicles B2, B3. Similarly, the controller 110 predicts a time at which the host vehicle A will arrive at the intersection based on the position and speed of the host vehicle A. The controller 110 imparts the priority order to the other vehicles B2, B3 such that the priority order increases as a temporal difference between the times of arrival at the intersection decreases. In the example shown in FIG. 4, the other vehicle B2 will pass through the intersection before the time at which the host vehicle A will arrive at the intersection, and the other vehicle B3 will arrive at the intersection at substantially the same time as the time at which the host vehicle A will arrive at the intersection. In this case, the controller 110 determines a highest priority order for the other vehicle B3 and determines a second-highest priority order for the other vehicle B2.

The controller 110 transmits second request data for requesting information pertaining to the other vehicles B2, B3. In this case, the controller 110 transmits the second request data in accordance with the priority order determined for the other vehicles B2, B3. Additionally, when receiving information pertaining to a plurality of other vehicles, it is permissible for the controller 110 to request only information pertaining to several higher-order other vehicles having a high priority order. Upon receiving the second request data, the server 500 produces object data including information pertaining to the other vehicles B2, B3 and transmits the object data to the communication unit 100. When the communication unit 100 receives the object data (S16), the controller 110 acquires the object data. The object data includes detailed information pertaining to the other vehicles B2, B3.

The controller 110 determines a designated vehicle in consideration of not only the current position and speed but also the detailed information (S18). The detailed information includes, inter alia, a type, a past trajectory, and a future trajectory that is based on a past travel trajectory of the other vehicles B2, B3. If it is evaluated, in consideration of the detailed information, that another vehicle will cross the path of the host vehicle A, the controller 110 specifies the other vehicle as a designated vehicle. In the example shown in FIG. 4, the other vehicle B3 is specified as the designated vehicle. When the designated vehicle has been specified, the controller 110 can interrupt transmission of the second request data for other vehicles having a lower priority order than another vehicle for which current-object data is received.

Figure 5:
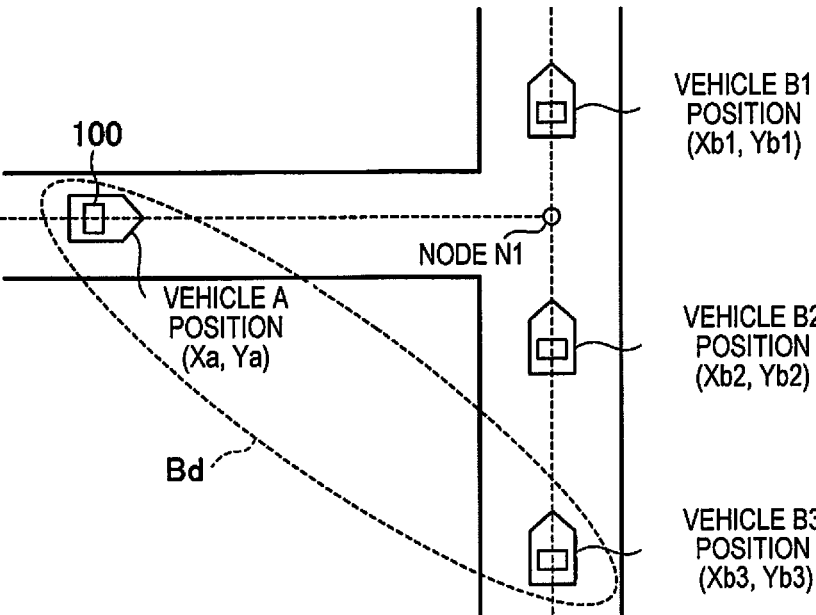
FIG. 5 is a diagram illustrating a designated vehicle and a directional beam.

If a designated vehicle is specified, the controller 110 switches the operating mode of the communication unit 100 from the normal mode to the directivity mode. In concert therewith, the controller 110 starts controlling an angle of the directional beam Bd (S20). As shown in FIG. 5, the controller 110 controls the directional beam Bd such that the directional beam Bd is oriented toward the other vehicle B3 that is the designated vehicle. Specifically, the controller 110 adjusts the beam axis Bd1 of the directional beam Bd to a prescribed azimuth. The azimuth over which the beam axis Bd1 is to be oriented is an azimuth for when the other vehicle B3 has been observed from the host vehicle A, it being possible to compute the azimuth based on the current position of the host vehicle A and the current position of the other vehicle B3 as acquired from the server 500. Controlling the azimuth of the beam axis Bd1 adjusts the directional beam Bd so as to be oriented toward the current position of the other vehicle B3.

If the host vehicle A is sufficiently distant from the intersection, the directional beam Bd might not reach the position where the other vehicle B3 is traveling even if the directional beam Bd is oriented toward the other vehicle B3. Accordingly, the controller 110 can start controlling the angle of the directional beam Bd under a condition that the host vehicle A is sufficiently near the intersection so that the directional beam Bd can reach the other vehicle B3 (S20). In this case, the controller 110 preferably specifies the other vehicle B3 and then predicts a position where the other vehicle B3 is moving until control of the angle of the directional beam Bd is started, and starts controlling the angle of the directional beam Bd based on a predicted post-movement position (S20).

When the directional beam Bd is oriented toward the other vehicle B3, the controller 110 controls the directional beam Bd so as to follow the moving other vehicle B3. Examples of methods for following the other vehicle B3 include continuously specifying the current position of the other vehicle B3 using vehicle-to-vehicle communication with the other vehicle B3 and controlling the azimuth of the directional beam Bd based on a most-recent current position. Alternatively, the controller 110 can control the azimuth of the directional beam Bd using feedback so as to search for a point where the reception strength is greatest.

The controller 110 starts the data communication with the other vehicle B3 (S22). This makes it possible to receive necessary information from the other vehicle B3.

The controller 110 monitors the other vehicle B3 (S24). Monitoring the other vehicle B3 includes monitoring the reception strength and monitoring the current position of the other vehicle B3.

Figure 6:
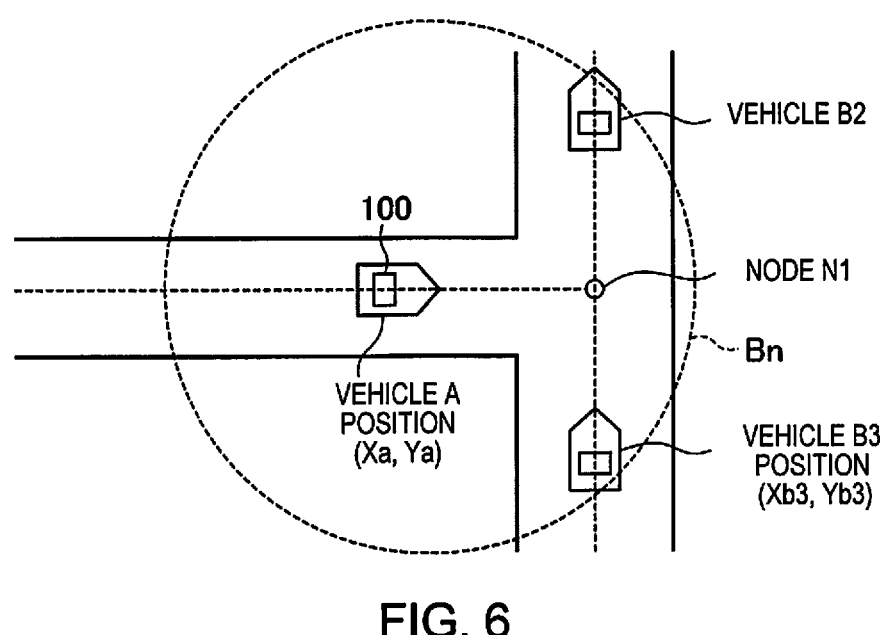
FIG. 6 is a schematic diagram showing switching to the normal mode.

The controller 110 evaluates whether or not a condition under which it is possible to communicate with the other vehicle B3 even using the normal beam Bn is met. Specifically, if the reception strength has risen at least to a given level, or if the current position of the other vehicle B3 is present within the area of the normal beam Bn, the controller 110 evaluates that the above-mentioned condition is met (Yes in S26). As shown in FIG. 6, the controller 110 switches the operating mode of the communication unit 100 to the normal mode (S28). However, if it is evaluated that the condition is not met, the controller 110 continues monitoring the other vehicle B3 (S24).

Thus, in the present embodiment, the controller 110 of the information processing device controls the directivity of the communication unit 100 based on information relating to other vehicles that is included in the server data distributed by the server 500. By using the server data, the controller 110 can ascertain information pertaining to the other vehicles with which the controller 110 cannot directly communicate. This makes it possible to control the directivity of the communication unit 100 so as to be oriented toward a desired communication target from which information pertaining to the other vehicles is obtained. As a result, it is possible to satisfactorily perform data communication with the communication target, therefore making it possible to suitably accept the necessary information.

In the present embodiment, the controller 110 of the information processing device specifies a vehicle that could cross the path of the host vehicle as a designated vehicle based on the information pertaining to other vehicles that is included in the server data. This makes it possible to acquire, from the server, information pertaining to a designated vehicle that appreciably affects future travel of the host vehicle. As a result, it is possible to control the directivity of the communication unit 100 so as to be oriented toward the desired communication target from which information pertaining to the designated vehicle is obtained, as well as to satisfactorily perform data communication with the communication target, therefore making it possible to suitably accept the necessary information.

In the present embodiment, the controller 110 of the information processing device specifies the designated vehicle based on the current position information and speed information pertaining to the host vehicle and the other vehicles. Considering the current position information and speed information pertaining to the host vehicle and the other vehicles makes it possible to suitably specify the designated vehicle that could cross the path of the host vehicle.

In the present embodiment, the controller 110 of the information processing device specifies the designated vehicle based on the priority order determined for the other vehicles. This makes it possible to efficiently specify the designated vehicle using data received from the server 500.

In the present embodiment, other vehicles having routes that pass through the intersection included in the future route of the host vehicle are given as examples of designated vehicles. The other vehicles are preferably regarded as designated vehicles due to having a high possibility of affecting the future travel of the host vehicle. This makes it possible to suitably ascertain other vehicles that could affect the future travel of the host vehicle.

In the present embodiment, the controller 110 of the information processing device controls the directivity of the communication unit 100 based on the position information pertaining to the designated vehicle, which is server data. This makes it possible for the controller 110 to suitably recognize the position of the designated vehicle.

In the present embodiment, the controller 110 of the information processing device controls the directivity of the communication unit 100 so as to be oriented toward the designated vehicle. This makes it possible for the host vehicle to reliably perform data communication with the designated vehicle, therefore making it possible to directly accept information pertaining to the designated vehicle.

When the communication unit 100 operates in the normal mode in which the communication unit 100 does not have directivity, there can be cases in which data communication with the desired communication target cannot be satisfactorily performed depending on communication distance or level of visibility. However, switching the operating mode of the communication unit 100 to the directivity mode makes it possible to form a beam having directivity. This makes it possible to control the directivity of the communication unit 100 relative to the desired communication target, therefore making it possible to satisfactorily perform data communication with the communication target. As a result, it is possible to suitably accept necessary information.

Figure 7:
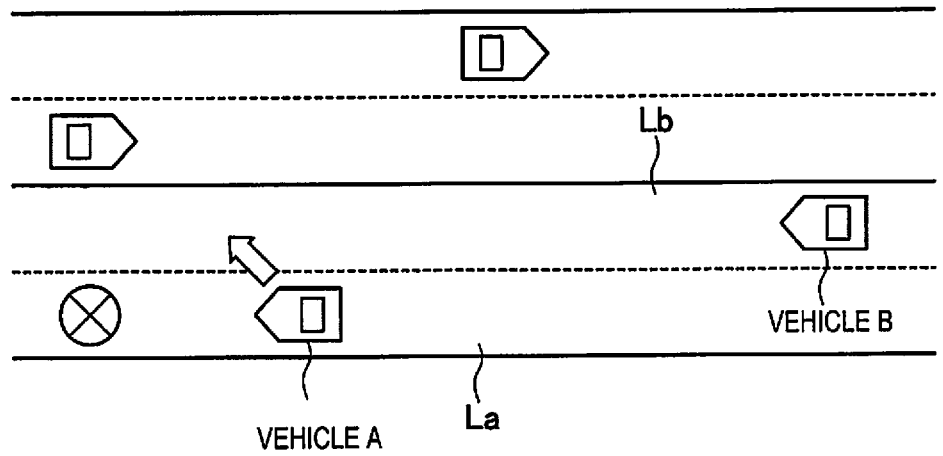
FIG. 7 is a diagram illustrating a travel scenario in which the present embodiment can be applied.

In the embodiment described above, a scenario involving traveling through an intersection is given as an example of a particular situation. However, the particular situation can be a scenario in which another vehicle that could affect future travel of the host vehicle is present such that the host vehicle and the other vehicle will cross paths. For example, as shown in FIG. 7, said situation can be a scenario in which the host vehicle A traveling in a travel lane La changes lanes to an overtaking lane Lb to perform an overtaking maneuver. Another vehicle B traveling in the overtaking lane Lb could cross the path of the host vehicle A, and therefore there is a high possibility that the other vehicle B will affect future travel. Therefore, in a scenario involving a lane change, the other vehicle B having a route involving traveling in the overtaking lane Lb on the road on which the host vehicle A is traveling is specified as the designated vehicle. This makes it possible to suitably ascertain the other vehicle B that could affect future travel of the host vehicle A. A scenario involving overtaking can also include a situation in which an oncoming lane is used to perform an overtaking maneuver, in addition to a situation involving changing lanes to a passing lane to perform an overtaking maneuver.

The controller 110 preferably performs the process for specifying the designated vehicle when it is assessed that the host vehicle is performing an overtaking maneuver. For example, when an operation signal that permits an occupant to perform an overtaking maneuver is detected, the controller 110 determines that the host vehicle is performing an overtaking maneuver. Alternatively, the controller 110 can autonomously assess, based on map information and data pertaining to traveling vehicles, that the host vehicle is performing an overtaking maneuver under a condition that an obstacle is present in front of the host vehicle in the travel lane or that a preceding vehicle slower than the host vehicle is present. Thus, when the host vehicle is performing an overtaking maneuver, performing the process for specifying the designated vehicle using an overtaking maneuver by the host vehicle as a trigger makes it possible to specify the designated vehicle at a suitable timing.

In the present embodiment, when specifying the designated vehicle, the controller 110 controls the directional beam Bd so as to be oriented toward the designated vehicle. However, the goal of communication with the designated vehicle performed by the host vehicle is to acquire information pertaining to the designated vehicle that will cross the path of the host vehicle. Even if the directional beam Bd is formed, vehicle-to-vehicle communication with the designated vehicle might be impossible due to a communication environment in which an obstruction is present between the host vehicle and the designated vehicle.

Figure 8:
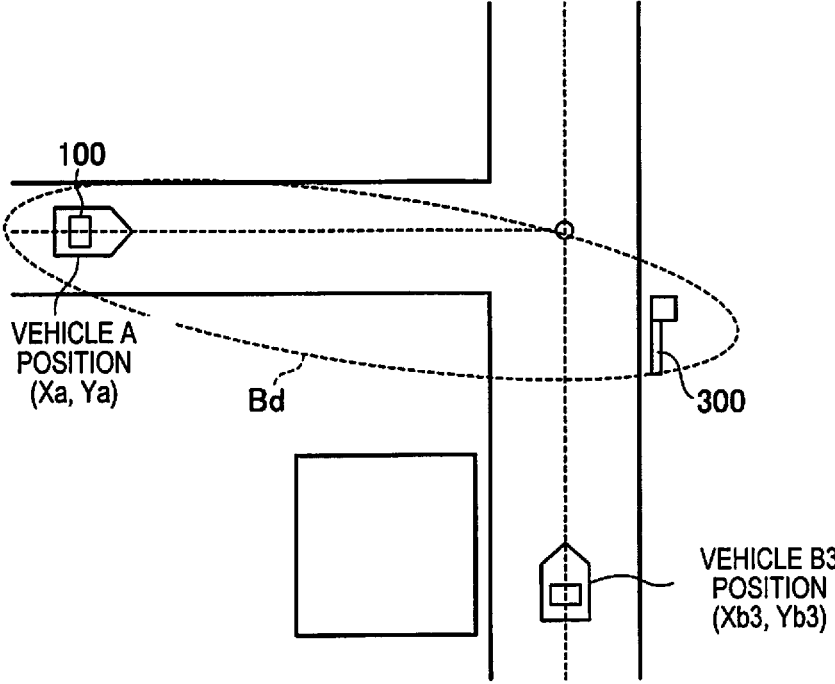
FIG. 8 is a schematic diagram showing a roadside unit and a directional beam.

As shown in FIG. 8, the roadside unit 300 for distributing information pertaining to the vehicles can be present on the road on which the host vehicle is traveling. Accordingly, when the roadside unit 300 for transmitting distribution data including information pertaining to the designated vehicle is present, the controller 110 can control the directional beam Bd so as to be oriented toward the roadside unit 300. For example, the controller 110 can evaluate whether or not a roadside unit 300 for transmitting distribution data including information pertaining to the designated vehicle is present based on data distributed from the server 500. It is also possible to acquire, from the distribution data, position information pertaining to the roadside unit 300 toward which the directional beam Bd is to be oriented.

Thus, the controller 110 of the information processing device can control the directivity of the communication unit 100 so as to be oriented toward the roadside unit 300 for transmitting distribution data including information pertaining to the designated vehicle. This makes it possible to reliably perform data communication with the roadside unit 300, therefore making it possible to suitably accept information pertaining to the designated vehicle. Specifically, the controller 110 can regard the roadside unit 300 for transmitting distribution data including information pertaining to the designated vehicle as a designated vehicle, rather than regarding the designated vehicle directly.

According to an information processing method disclosed in the present embodiment, directivity of a communication unit 100 is controlled based on information relating to a designated vehicle included in server data distributed by a server 500, similarly to the information processing device. This makes it possible to control the directivity of the communication unit 100 so as to be oriented toward a desired communication target from which information pertaining to the designated vehicle is obtained, as well as to satisfactorily perform data communication with the communication target, therefore making it possible to suitably accept necessary information.

In the present embodiment, an example is given in which a plurality of information processing circuits provided to controllers 110, 210 are realized using software. However, as shall be apparent, it is also possible to configure the information processing circuits by preparing dedicated hardware for processing various information. It is also possible for the plurality of information processing circuits to be configured from individual items of hardware.

Although an embodiment of the present invention is disclosed as described above, statements and drawings that form parts of this disclosure is not to be construed to limit the present invention. A variety of alternative embodiments, examples, and techniques for implementation will be apparent to persons skilled in the art from this disclosure.

The invention claimed is:

1. An information processing device comprising:
a communication unit configured to be mounted on a first moving body and to perform data communication with a second moving body present around the first moving body and with a server that distributes prescribed server data; and
a controller configured to control the data communication performed by the communication unit,
the communication unit having a normal mode and a directivity mode in which directivity of wireless communication can be controlled to a greater extent than in the normal mode to make possible the data communication with the second moving body being present at a position at which the data communication is impossible to perform in the normal mode,
the controller being configured to
receives server data from the server that includes information pertaining to the second moving body present at the position at which the data communication is impossible to perform in the normal mode, the information relating to the second moving body includes current position information pertaining to the second moving body, and
control the directivity of the wireless communication performed by the communication unit based on the information pertaining to the second moving body that is included in the server data.

2. The information processing device according to claim 1, wherein
the controller is configured to specify the second moving body that could cross a path of the first moving body as a designated moving body based on the information relating to the second moving body that is included in the server data, and
control the directivity of the wireless communication performed by the communication unit based on information pertaining to the designated moving body.

3. The information processing device according to claim 2, wherein
the information relating to the second moving body further includes speed information pertaining to the second moving body, and
the controller is configured to specify the designated moving body based on the current position information and the speed information pertaining to the second moving body and current position information and speed information pertaining to the first moving body.

4. The information processing device according to claim 3, wherein
the controller is configured to determine a priority order for the second moving body that could cross the path of the first moving body based on the current position information and the speed information pertaining to the second moving body and the current position information and the speed information pertaining to the first moving body, and then specify the designated moving body based on the priority order.

5. The information processing device according to claim 3, wherein
the communication unit is configured to perform the data communication with a roadside unit disposed in a periphery of a road on which the first moving body is traveling; and
the controller is configured to control the directivity of the wireless communication performed by the communication unit so as to be oriented toward the roadside unit, which transmits distribution data that includes information pertaining to the designated moving body.

6. The information processing device according to claim 2, wherein
the designated moving body is
a second moving body having a route that passes through an intersection included in a route on which the first moving body will travel in the future, or
a second moving body having a route for traveling in a passing lane on a road on which the first moving body is traveling.

7. The information processing device according to claim 2, wherein
the controller is configured to control the directivity of the wireless communication performed by the communication unit based on the position information pertaining to the designated moving body.

8. The information processing device according to claim 7, wherein
the controller is configured to control the directivity of the wireless communication performed by the communication unit so as to be oriented toward the designated moving body.

9. The information processing device according to claim 2, wherein
the controller is configured to
determine whether or not the first moving body is passing, and
perform a process to specify the designated moving body upon determining that the first moving body is passing.

10. The information processing device according to claim 1, wherein the communication unit is configured to form a beam at every bearing in the normal mode, and form a beam having directivity in the directivity mode; and the controller is configured to control the directivity of the beam when controlling the directivity of the wireless communication performed by the communication unit.

11. An information processing method for an information processing device comprising a communication unit configured to be mounted on a first moving body and performs data communication with a second moving body around the first moving body and with a server that distributes prescribed server data, and a controller configured to control the data communication performed by the communication unit, the communication unit having a normal mode and a directivity mode in which directivity of wireless communication can be controlled to a greater extent than in the normal mode to make possible the data communication with the second moving body being present at a position at which data communication is impossible to perform in the normal mode, the information processing method comprising:

receiving server data from the server that includes information pertaining to the second moving body present at which the data communication is impossible to perform in the normal mode, the information relating to the second moving body includes current position information pertaining to the second moving body, and controlling the directivity of the wireless communication performed by the communication unit based on the information pertaining to the second moving body that is included in the server data.

\* \* \* \* \*